(12) United States Patent
Fink et al.

(10) Patent No.: US 6,467,398 B2
(45) Date of Patent: Oct. 22, 2002

(54) METHOD AND APPARATUS FOR MAKING BOWL-SHAPED SNACK FOOD PRODUCTS

(75) Inventors: Timothy J. Fink, Flower Mound; Ernest Marshall, Dallas, both of TX (US); Peris W. Njenga, Chicago, IL (US); James L. Sanford, Kemp, TX (US); James W. Stalder; Kevin Trick, both of Dallas, TX (US)

(73) Assignee: Recot, Inc., Pleasanton, CA (US)

( * ) Notice: Subject to any disclaimer, the term of this patent is extended or adjusted under 35 U.S.C. 154(b) by 0 days.

(21) Appl. No.: 09/948,710

(22) Filed: Sep. 10, 2001

(65) Prior Publication Data

US 2002/0108501 A1 Aug. 15, 2002

Related U.S. Application Data

(60) Continuation of application No. 09/776,697, filed on Feb. 6, 2001, now abandoned, which is a continuation of application No. 09/515,620, filed on Feb. 29, 2000, now abandoned, which is a division of application No. 09/135,085, filed on Aug. 17, 1998, now Pat. No. 6,129,939.

(51) Int. Cl.[7] ............................. A23L 1/01; A47J 37/12
(52) U.S. Cl. ............................. 99/330; 99/339; 99/353; 99/355; 99/373; 99/404; 99/407
(58) Field of Search ........................ 99/330, 339, 340, 99/353–355, 372, 373, 386, 403–407, 410, 409, 426, 443 C, 443 R; 426/438–440, 505, 512, 496, 499

(56) References Cited

U.S. PATENT DOCUMENTS

| | | | | |
|---|---|---|---|---|
| 1,926,313 A | * | 9/1933 | Smith | 426/439 |
| 2,112,309 A | * | 3/1938 | Santillan | 99/353 |
| 2,512,591 A | * | 6/1950 | Alexander | 99/353 X |
| 2,614,485 A | | 10/1952 | Sinkwitz et al. | |
| 2,855,308 A | * | 10/1958 | Buechele et al. | 426/438 |
| 3,132,949 A | | 5/1964 | Crowe | |
| 3,149,978 A | | 9/1964 | Anderson et al. | |
| 3,267,836 A | | 8/1966 | Yepis | |
| 3,394,646 A | | 7/1968 | Cunningham et al. | |
| 3,440,953 A | * | 4/1969 | Griffon | 99/404 X |
| 3,512,990 A | | 5/1970 | Slaybaugh | |
| 3,520,248 A | | 7/1970 | MacKendrick | |
| 3,605,605 A | | 9/1971 | Sanchez | |
| 3,626,466 A | * | 12/1971 | Liepa | 99/353 |
| 3,690,895 A | | 9/1972 | Amadon et al. | |
| 3,722,400 A | | 3/1973 | Jimenez | |
| 3,911,805 A | | 10/1975 | Baird | |
| 4,166,139 A | | 8/1979 | Ishida | |
| 4,273,791 A | | 6/1981 | Hanson et al. | |
| 4,510,165 A | | 4/1985 | Caridis et al. | |
| 4,554,865 A | | 11/1985 | Caridis et al. | |
| 4,650,687 A | | 3/1987 | Willard et al. | |
| 4,754,699 A | | 7/1988 | Cope et al. | |
| 5,020,426 A | | 6/1991 | Cope et al. | |
| 5,052,287 A | | 10/1991 | Chiang | |

FOREIGN PATENT DOCUMENTS

| | | |
|---|---|---|
| JP | 57054561 | 4/1982 |
| JP | 03127941 | 5/1991 |

* cited by examiner

*Primary Examiner*—Timothy F. Simone
(74) *Attorney, Agent, or Firm*—Rothwell, Figg, Ernst & Manbeck

(57) ABSTRACT

A method and apparatus for making bowl-shaped snack food products, e.g. tortilla chips. The method features placing chip preforms in open bowl-shaped cavities and partially frying the chip preforms by filling them with hot oil from above. Additionally, the preforms are partially fried from below by immersing the lower portions of the preforms in a vat of hot oil and transporting them through the hot oil. After cooking the preforms to a desired moisture content, at which point the preforms retain their bowl shapes outside of or independent of the mold cavities, the preforms are removed from the mold cavities and subsequently cooked to completion in a secondary frying operation. The invention also features an apparatus to carry out the method.

18 Claims, 12 Drawing Sheets

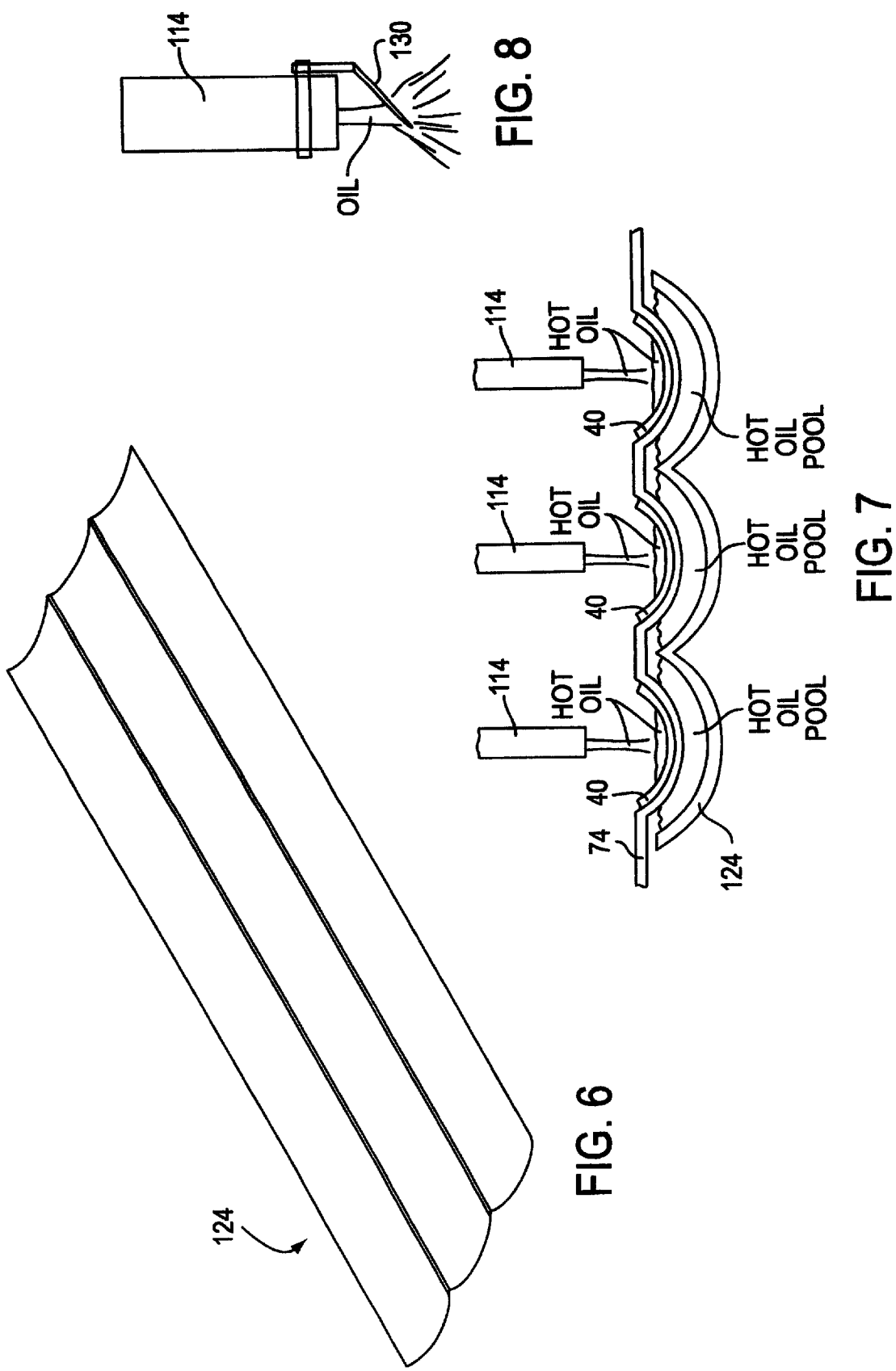

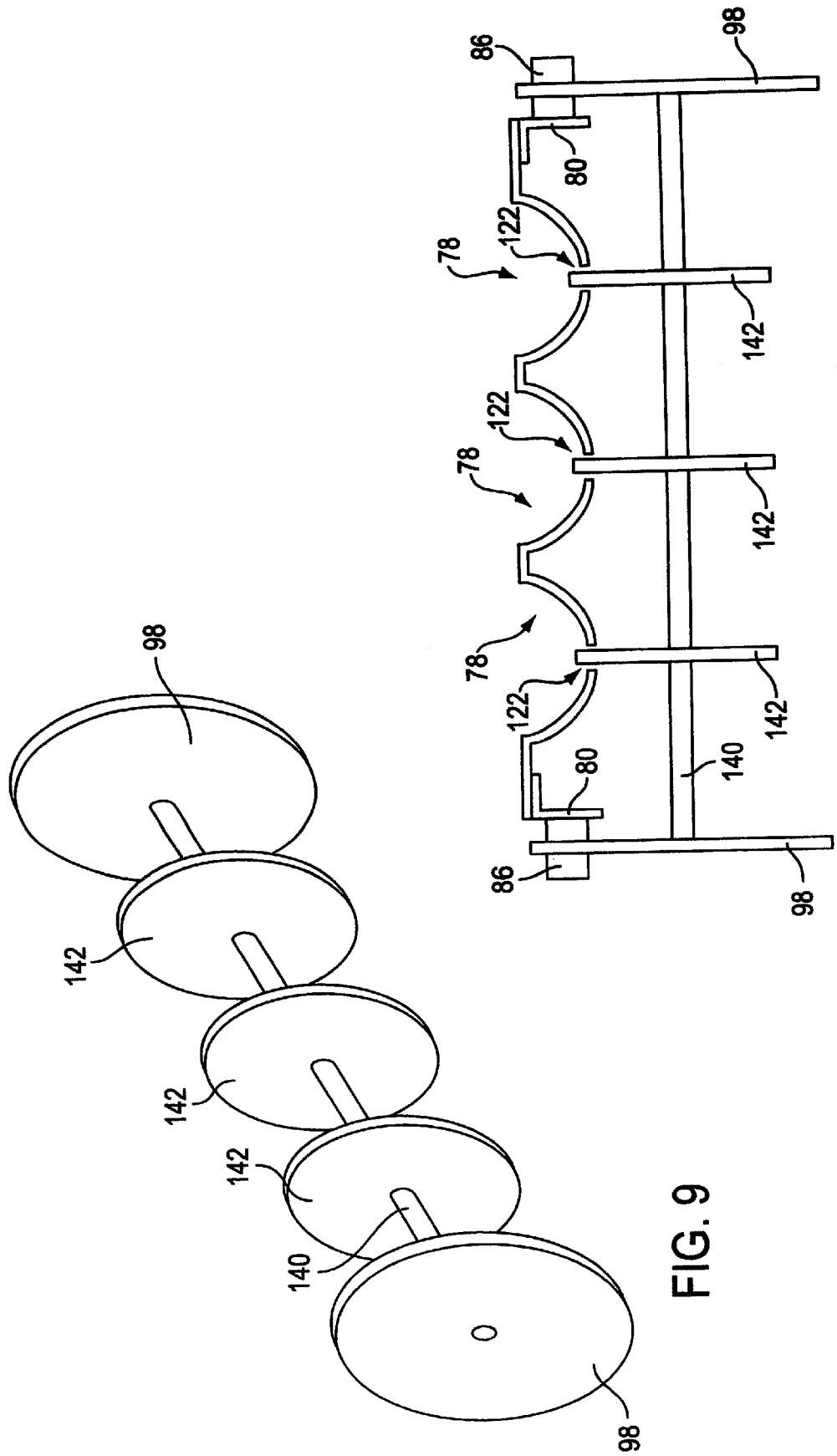

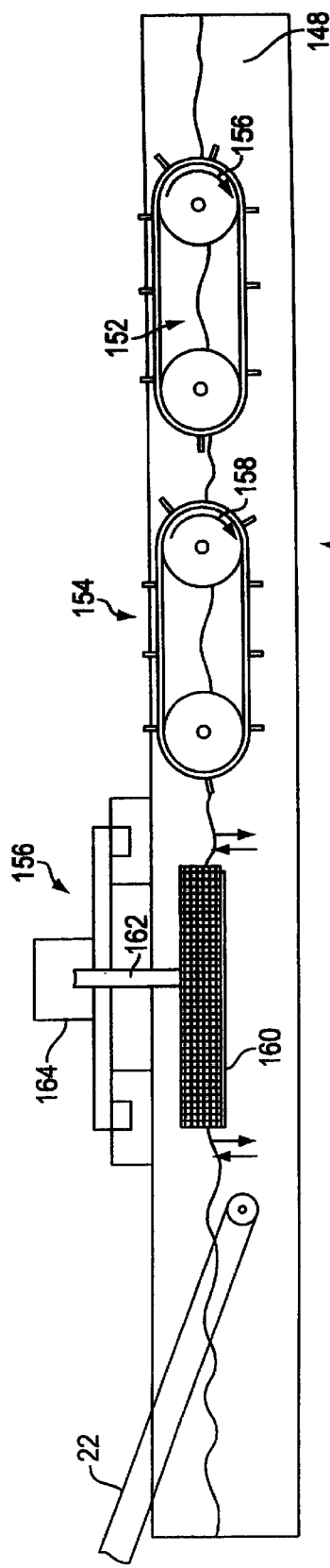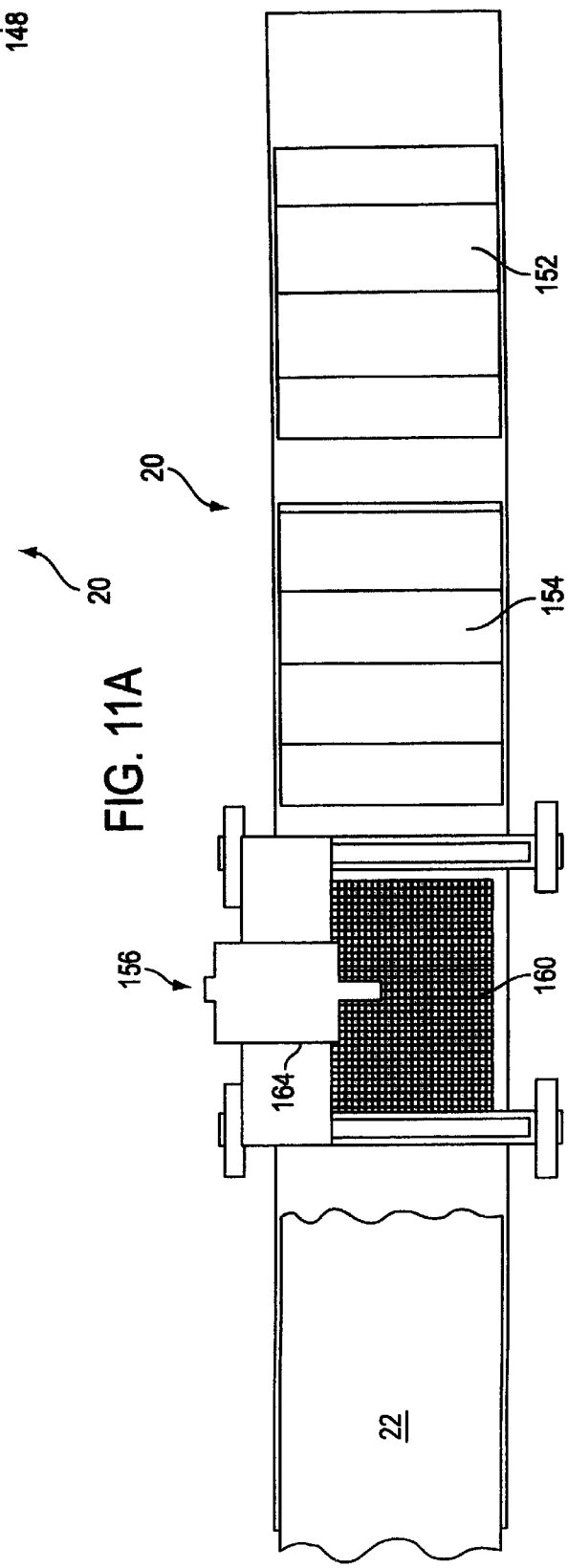
FIG. 11A
FIG. 11B

METHOD AND APPARATUS FOR MAKING BOWL-SHAPED SNACK FOOD PRODUCTS

This is a continuation application of Ser. No. 09/776,697 filed Feb. 6, 2001, now abandoned which is a continuation of Ser. No. 09/515,620, filed Feb. 29, 2000 now abandoned, which is a divisional application of Ser. No. 09/135,085, now filed Aug. 17, 1998 U.S. Pat. No. 6,129,939 issued Oct. 10, 2000. The invention relates generally to a method and apparatus for food production and, more specifically, to a method and apparatus for making fried, bowl- or other scoop-shaped snack food chips.

BACKGROUND OF THE INVENTION

1. Technical Field
2. Description of the Background Art

In general, there are a number of food products which are shaped to help the product satisfy a particular function. For example, taco shells often are made by frying corn dough in a folded-over configuration to provide a U-shaped "trough" which is filled with the taco ingredients. With respect to snack food products, consumers often prefer a bowl- or scoop-shaped chip (corn chip, tortilla chip, potato chip, etc.) when eating chips with dip (salsa, bean dip, cheese dip, etc.) because the bowl- or scoop-shaped configuration gives the chip strength—thereby preventing breakage of the chip while scooping dip—and allows the consumer to scoop up a larger, more satisfying portion of dip.

In the past, the methods and apparatus used to make such shaped products have been somewhat complex. In particular, they have tended to use closed molds in which the product is fixedly held while being cooked. Such configurations, although successful in the sense that they perform the desired function, are difficult to manufacture and prone to breakdown. Accordingly, there has been a need for a method and apparatus to make shaped fried food products (bowl-shaped snack food chips in particular) that is less complex and easier to operate than has been the case in the past.

SUMMARY OF THE INVENTION

The method and apparatus according to the invention satisfy this need. In particular, the invention features frying bowl- or scoop-shaped chip preforms by placing the preforms in bowl-shaped mold cavities to give the preforms a bowl shape, and filling the bowls of the preforms with hot oil to cook the chip preforms "from the inside." Preferably, the preforms are only partially cooked while in the mold cavities, i.e., to a moisture content at which they are able to retain their bowl shape independent of the cavities. At that point, the preforms are removed from the cavities and cooked until completion in a second cooking step.

Thus, in a first aspect, the invention features a method of making a bowl-shaped snack food product. The method includes placing chip preforms made from uncooked dough in upwardly concave bowl-shaped mold cavities such that the chip preforms are formed into a bowl shape. The bowl-shaped preforms are then at least partially filled with oil that is hot enough to fry the dough such that the preforms are partially cooked by means of the hot oil. The partially cooked preforms are then removed from the mold cavities and cooked to completion in a second cooking step.

In preferred embodiments, the preforms are fried in the first cooking step only until they are able to retain their bowl shape when removed from the mold cavities, i.e., when they have reached a predetermined moisture content. Furthermore, lower portions of the chip preforms may be disposed in hot oil so that the preforms are cooked "from the outside" of the bowl. This may be accomplished by having the mold cavities perforated and dipping the bottom portions of the mold cavities in hot oil. The chip preforms may be removed from the mold cavities by inverting the mold cavities, preferably while simultaneously pushing the preforms out of the cavities by means of ejector members which extend into the mold cavities.

Preferably, the preforms are cooked to completion in a second vat of hot oil. They may be removed from the vat of hot oil by a conveyer that extends out of the vat. Preferably, the preforms are given a desired open-end-down configuration by being dunked or submerged more deeply into the oil and then allowed to float back up to the surface of the oil, with hydrodynamic drag forces causing the bowl-shaped preforms to become inverted as they float up.

In another aspect, the invention features a method of making a bowl-shaped snack food product, in which method chip preforms made of uncooked dough are disposed in upwardly concave, bowl-shaped mold cavities such that they are formed into a bowl shape, and the bowl-shaped preforms are not restrained within the cavities. The unrestrained preforms are then at least partially fried while in the mold cavities, e.g., by being filled with hot oil. Preferably, the preforms are simultaneously fried by having their lower portions partially emerged into a vat of hot oil.

In yet another aspect, the invention features a method of making a bowl-shaped snack food product, in which bowl-shaped chip preforms, which are able to retain their bowl shape independently of any forming means, are disposed in a vat of hot oil to fry the dough and fried until they are fully cooked.

In a still further aspect, the invention features a method of removing cooked food product pieces from a vat of a cooking medium, e.g. hot oil, with a desired orientation to facilitate draining of the pieces. The food product pieces are submerged more deeply in the cooking medium as they float downstream in the medium, and hydrodynamic drag forces cause the food product pieces to assume a desired orientation as they float up to the surface.

In another aspect, the invention features an apparatus for making bowl-shaped food product. The apparatus includes a housing and a plurality of mold bodies disposed within the housing. The mold bodies each have one or more upwardly opening bowl-shaped cavities into which chip preforms made from uncooked dough are placed to give the chip preforms a bowl shape. The apparatus includes a cooking medium distribution system, e.g. an array of nozzle pipes, located above the mold bodies to fill the bowl-shaped preforms with a first cooking medium, e.g. hot oil, thereby cooking the preforms from the insides thereof.

Preferably, the mold bodies are configured to move through the housing, e.g., by having several mold bodies linked together into an endless belt which is disposed within the housing. Preferably, the apparatus is configured such that lower portions of the mold cavities are immersed into a vat or pool of hot oil and the mold cavities have perforated walls which allow hot oil to flow up into the cavities from below, thereby cooking the chip preforms from below, i.e., from the outside of the bowls. Preferably, the apparatus is configured such that the preforms are filled with the cooking medium from above before the preforms are partially immersed into the medium below.

In preferred embodiments, the mold bodies are connected in an endless belt which is trained around one or more ejector wheels. The ejector wheels extend partially up into the cavities through slots in the bottoms of the cavities to help eject the partially cooked preforms from the cavities.

The apparatus may include a conveyor assembly which transports the preforms to the mold bodies, and an air cushion transfer chute which transfers the chip or preforms from conveyor assembly into the mold cavities.

The apparatus may further include a secondary cooking station where cooking of the chip preforms is completed, e.g., a vat for forming a pool or a bath of a second cooking medium such as hot oil. The chip preforms may be removed from the vat by means of a conveyor extending out of the vat, and preferably the vat has a chip orienting means that gives the chips a desired orientation before they are carried out of the hot oil, e.g., a reciprocating plunger which dunks the snack food product pieces and allows them to float back up to the surface with hydrodynamic forces (drag) causing the snack food product pieces to assume the desired orientation.

BRIEF DESCRIPTION OF THE DRAWINGS

The invention will now be described in greater detail in connection with the drawings, in which coiling

FIG. 6 is a schematic perspective view of a conformal oil pan used in the partial fryer shown in FIG. 1;

FIG. 7 is a schematic view showing hot oil filling and cooking bowl-shaped chip preforms with oil according to the invention;

FIG. 8 is a schematic detail view showing a baffle or flow diverter used to reduce the force of impact of the oil filling the bowl-shaped preforms in FIG. 7;

FIG. 9 is a schematic perspective view showing sprocket drive wheels and ejector wheels used in the partial fryer shown in FIG. 1;

FIG. 10 is a schematic section view, taken along the lines 10—10 in FIG. 1, showing the operation of the ejector wheels of FIG. 9;.

FIGS. 11A and 11B are a schematic side elevation view and a plan view, respectively, of the secondary fryer shown in FIG. 1.

DETAILED DESCRIPTION OF PREFERRED EMBODIMENTS

Figure 1:
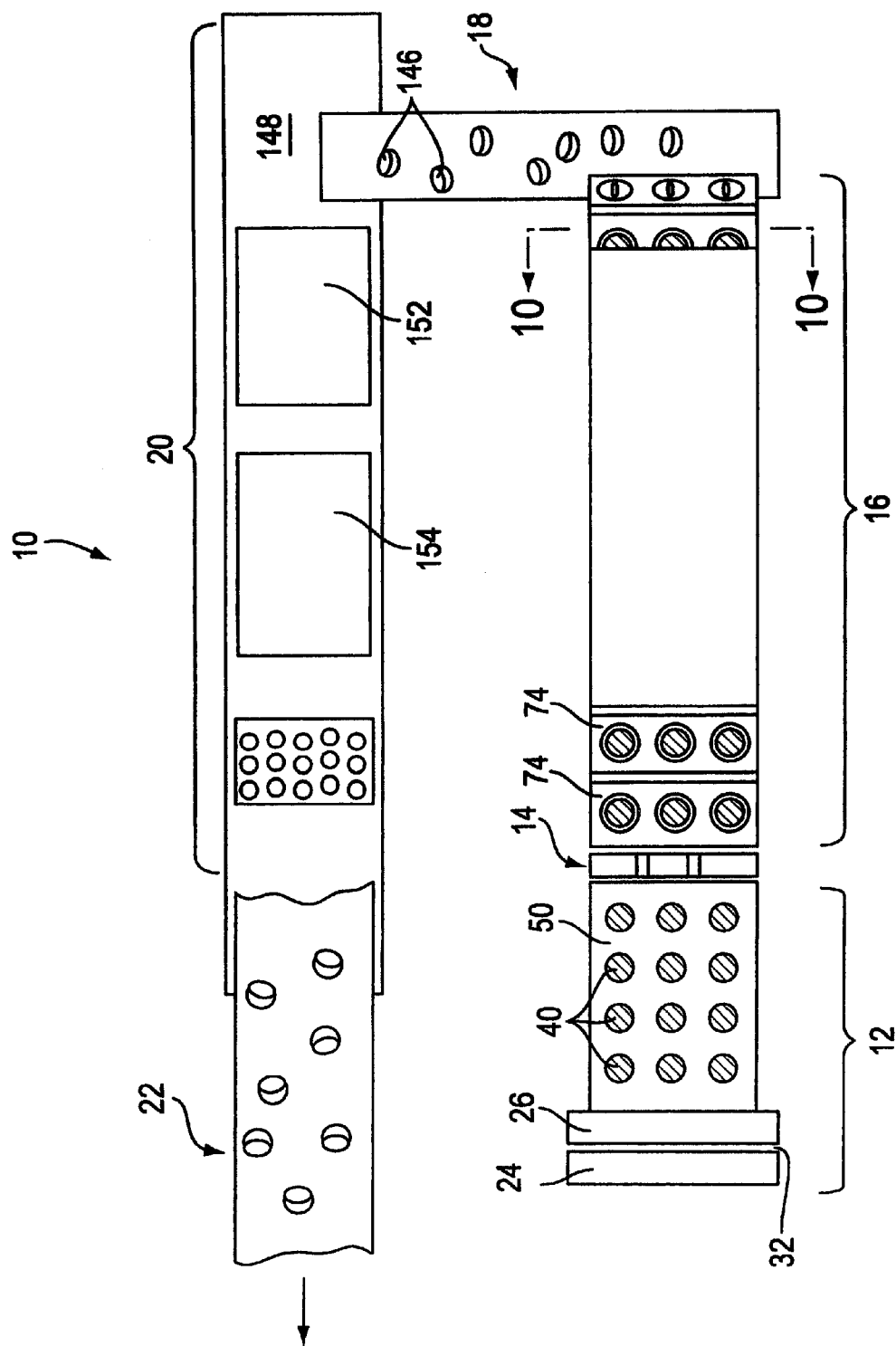
FIG. 1 is a schematic plan view of an apparatus for making bowl-shaped snack food products according to the invention.

A schematic plan view of a preferred embodiment of the invention is shown in FIG. 1. The apparatus 10 includes a sheeting and die-cutting portion 12; an air slide 14; a partial fryer 16; a transfer conveyor 18; a secondary fryer 20; and a final product take-away conveyor 22.

Figure 2:
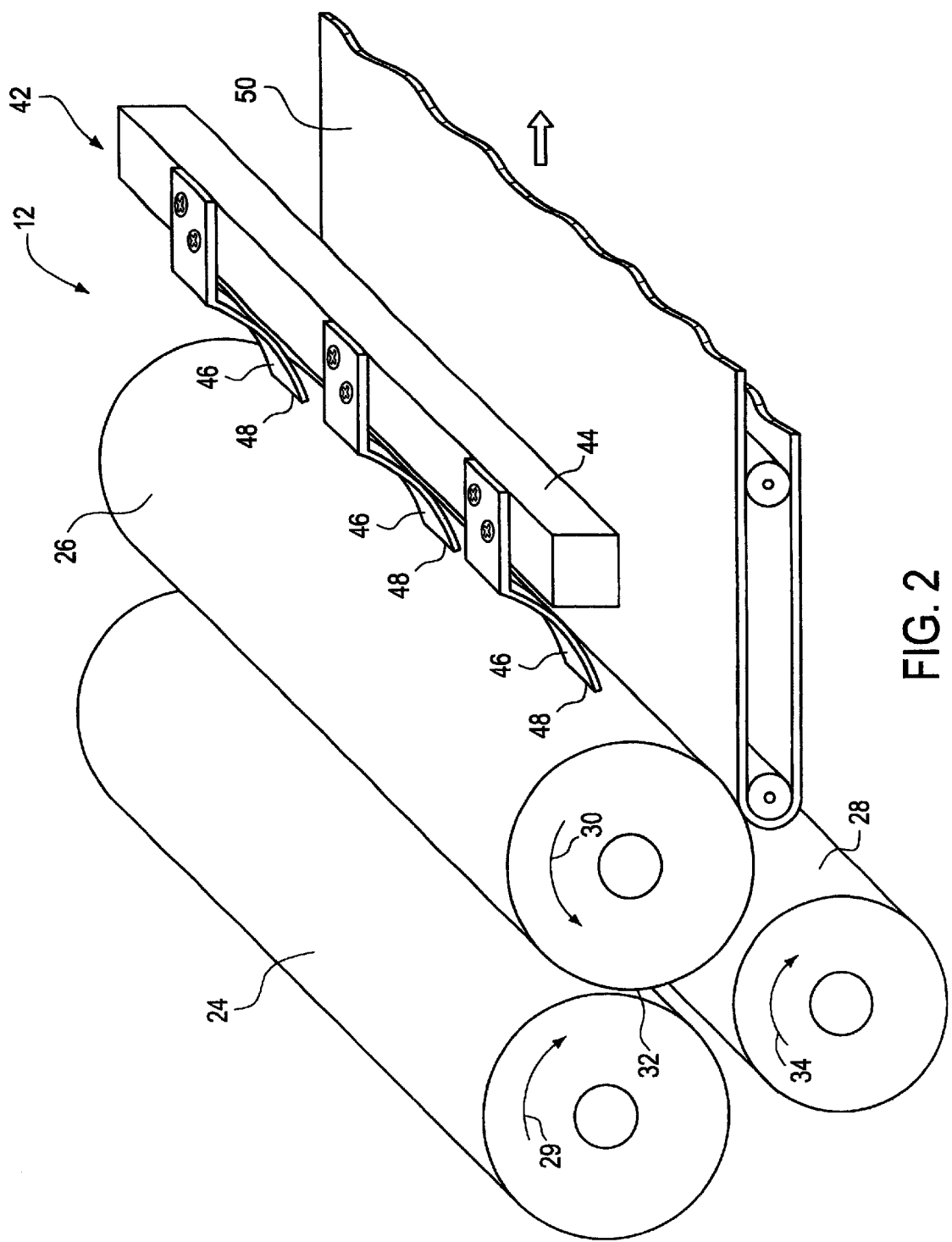
FIG. 2 is a schematic perspective view showing the sheeting and die-cutting portion of the apparatus shown in FIG. 1.
Figure 2A:
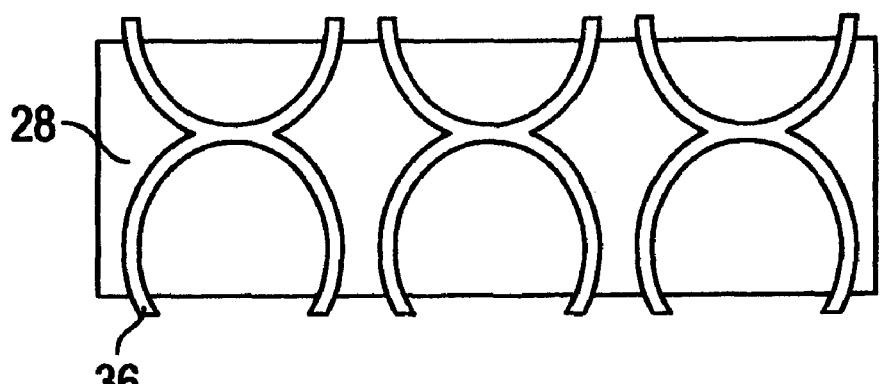
FIGS. 2A and 2B are a side elevation view and a flat pattern view, respectively, of the cutter roller shown in FIG. 2.
Figure 2B:
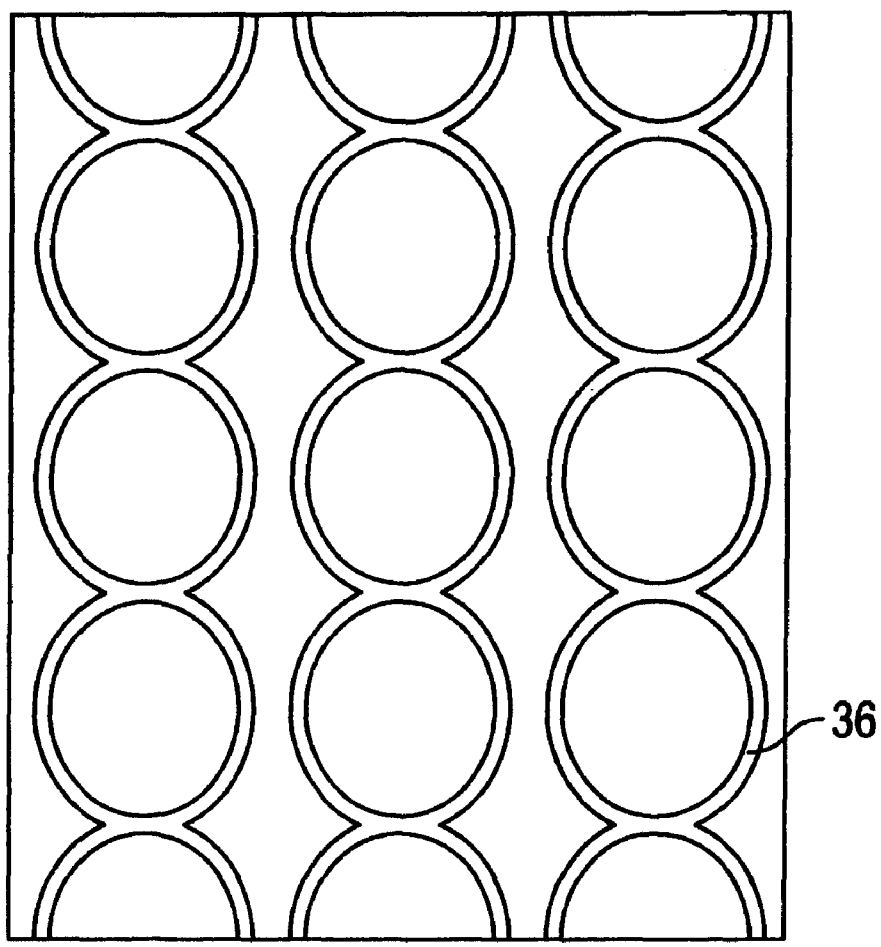

As shown in FIG. 2, the sheeting and die-cutting portion 12 includes at least one pair of sheeter rollers 24, 26 and a cutter roller 28, which is shown in greater detail in FIGS. 2A and 2B. Corn masa, which has been fed to a masa "hog" or hopper from a set of grinding stones along with a secondary stream of water to achieve a moisture content of approximately 49.5% and an average grain size of approximately 0.024 inch, is fed between the sheeter rollers 24, 26 as is known in the art. The sheeter rollers 24, 26, which rotate in the directions indicated by arrows 29, 30, are separated by a gap 32 on the order of 0.032 inch to form a sheet of masa which preferably is on the order of 0.032 inch thick. Preferably, the width of the gap 32 is adjustable. Cutter roller 28, which rotates in the direction shown by arrow 34, has upstanding, preferably circular die-cutting ridges 36, as shown in FIGS. 2A and 2B (but not in FIG. 2). The cutter roller 28 is positioned such that the die-cutting ridges 36 contact the surface of sheeter roller 26. Thus, as the corn masa (or any other dough that might be used with the invention) is sheeted between the rollers 24, 26 and wraps around the bottom portion of the roller 26, it is cut into circular dough preforms 40 (FIG. 1), much like cutting dough with a cookie cutter and as generally is known in the art.

As further shown in FIG. 2, the sheeting and die-cutting portion 12 includes a preform removal assembly 42 (not shown in FIG. 1). The preform removal assembly 42 consists of a support bar 44 or equivalent support member that is attached in front of sheeter roller 26, preferably to the frame (not shown) supporting the sheeter and die-cutter rollers. A set of wing knives 46 is secured to support bar 44, with one wing knife 46 for each "column" of chip preforms formed by the cutter roller 28. The wing knives 46 taper in width from the support bar 44 to their tips 48, which are disposed against the surface of the sheeter roller 26. As the sheeter roller 26 rotates with the corn masa sheet clinging to it, the wing knives 46 lift the circular chip preforms 40 from the surface of the sheeter roller 26, and the preforms drop onto conveyor belt 50. The masa "lace," i.e., the part of the masa sheet surrounding the chip preforms, rotates back around into the gap 32 and is mixed with additional masa being fed between the sheeter rollers.

Preferably, the cutter roller 28 is configured such that the chip preforms formed by the cutting ridges 36 are laterally evenly spaced, i.e., along the length of the sheeter rollers or, in other words, transverse to the direction of travel of the conveyor 50 as shown in FIG. 1. Furthermore, it is essential that the cutter roller 28 be configured such that the chip preforms in each of the columns be aligned in rows extending transversely across the conveyor 50, as shown in FIG. 1 as well.

Figure 3:
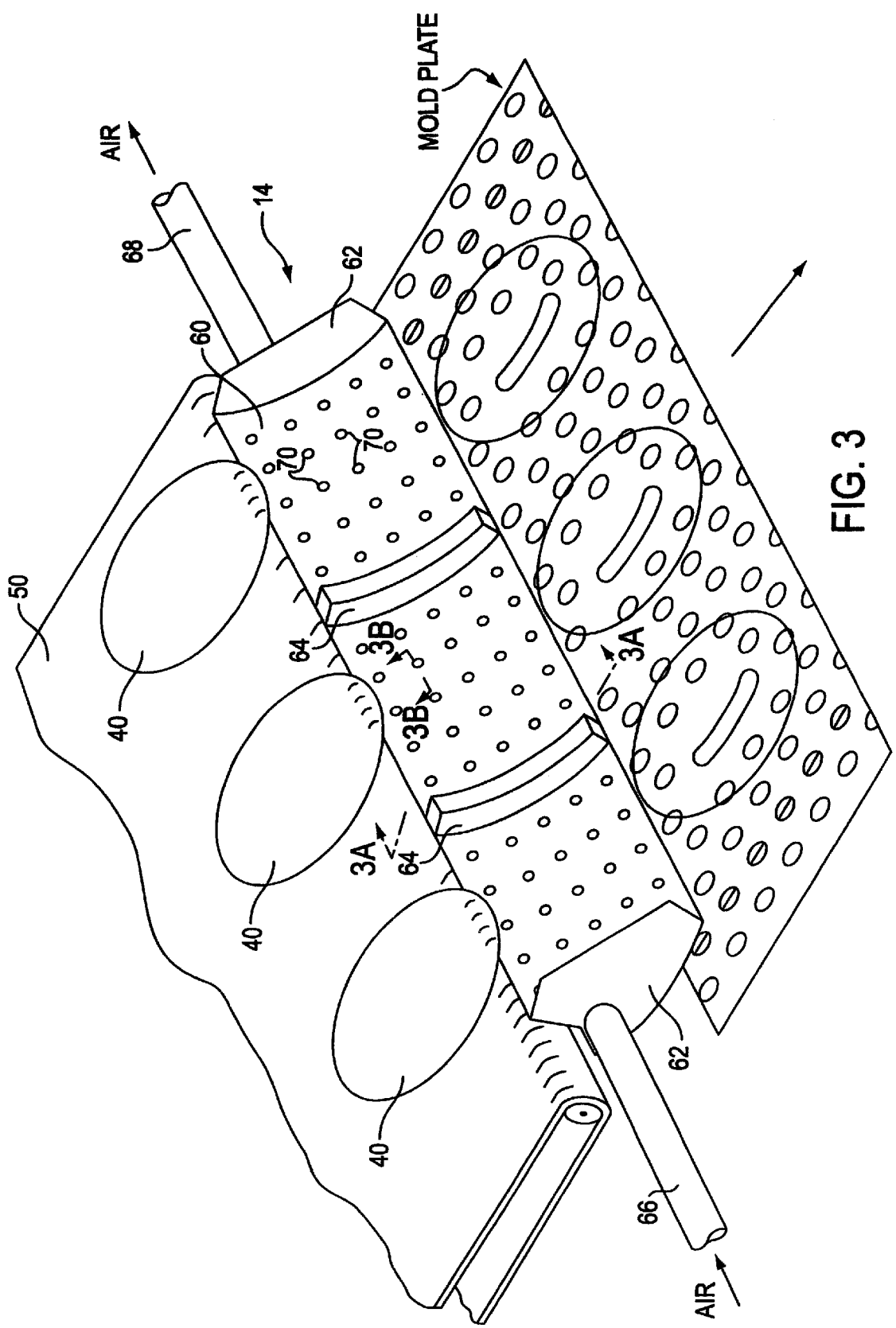
FIG. 3 is a schematic perspective view showing an air slide conveyor arrangement according to the invention.

The conveyor 50 transports the chip preforms 40 to the partial fryer 16. As described in greater detail below, the partial fryer 16 has a continuous belt of perforated mold plates having mold cavities formed therein, one of which mold plates is shown in FIG. 3. As further shown in FIG. 3, the air slide 14 is positioned at the downstream end of the conveyor 50 and is located just above the mold plates, at the leftmost end of the partial fryer 16 as it is shown in FIG. 1.

Figure 3B:
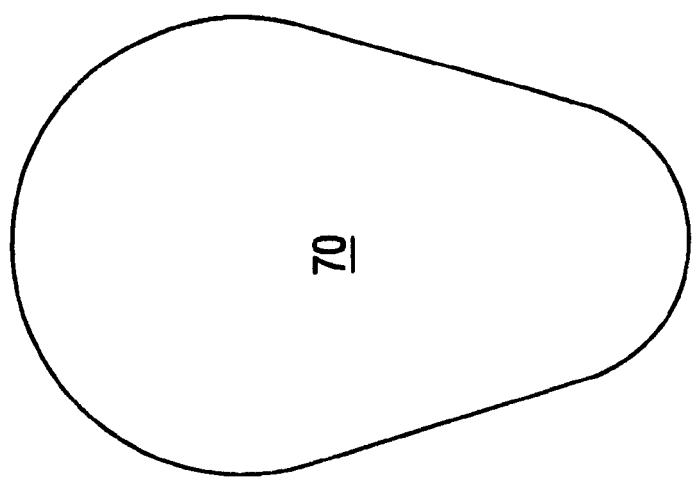
FIGS. 3A and 3B are a section view and a detailed view, respectively, of the air slide taken along the lines 3A—3A and 3B—3B, respectively, in FIG. 3.
Figure 3A:
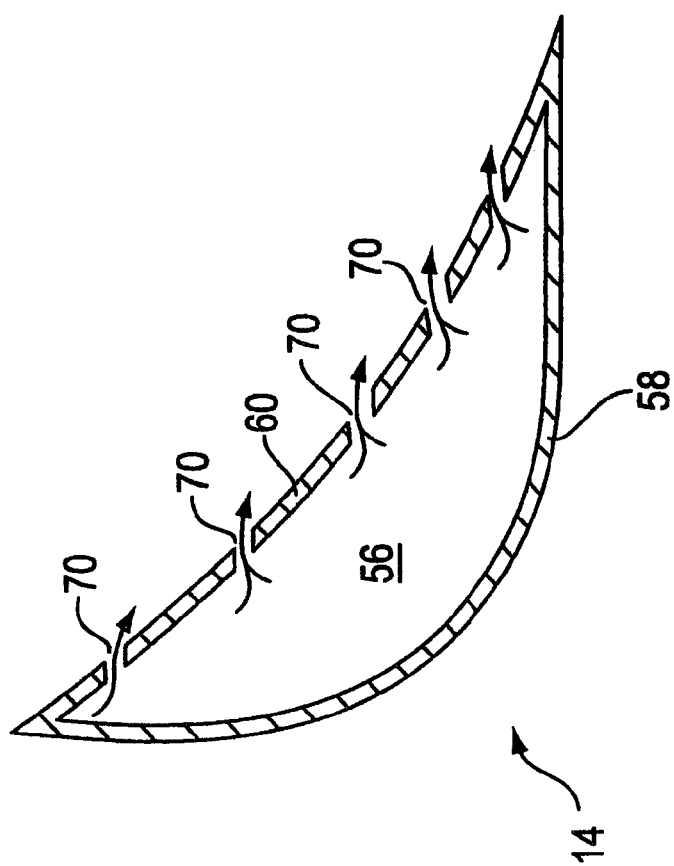

As illustrated in FIG. 3A, the air slide 14 is formed from sheet metal which defines a plenum or chamber 56. the plenum 56 is bounded by a back wall 58 and a perforated front or slide wall 60. The ends of the plenum 56 are bounded by end plates 62 (FIG. 3), and guide rails 64 are attached to the front of slide wall 60, e.g., by welding. The end plates 62 extend slightly above the slide wall 60 such that they, along with the guide rails 64, help guide the chip preforms into the mold cavities.

Air inlet pipes 66 and 68 extend into the plenum 56 through apertures in the respective end plates 62 and are secured therein, e.g., by welding. Pressurized air is pumped into the plenum 56 through the air inlet pipes and, as shown in FIG. 3A, flows out of the plenum 56 through perforations 70 in the front or slide wall 60. This creates a slight cushion of air above the surface of the air slide 14 which helps the chip preforms 40 slide smoothly and cleanly into the mold cavities, much like an "air hockey" disk sliding over an "air hockey" table.

As shown in FIG. 3B, the perforations 70 are drilled, e.g., by laser, so that they have a generally inverted teardrop profile. This helps direct the air-flowing out of the plenum downward along the surface of the front or slide wall 60, as opposed to straight through or perpendicular to the wall. This feature is important (as, in general, is the air cushion provided by the air slide) in order to ensure that the chip preforms 40 slide smoothly into their respective mold cavities. This prevents them from blowing upward off of or dragging along the air slide 14, either of which could cause the preforms to get folded over in the mold cavities, thereby leading to deformed, wasted product.

Figure 4A:
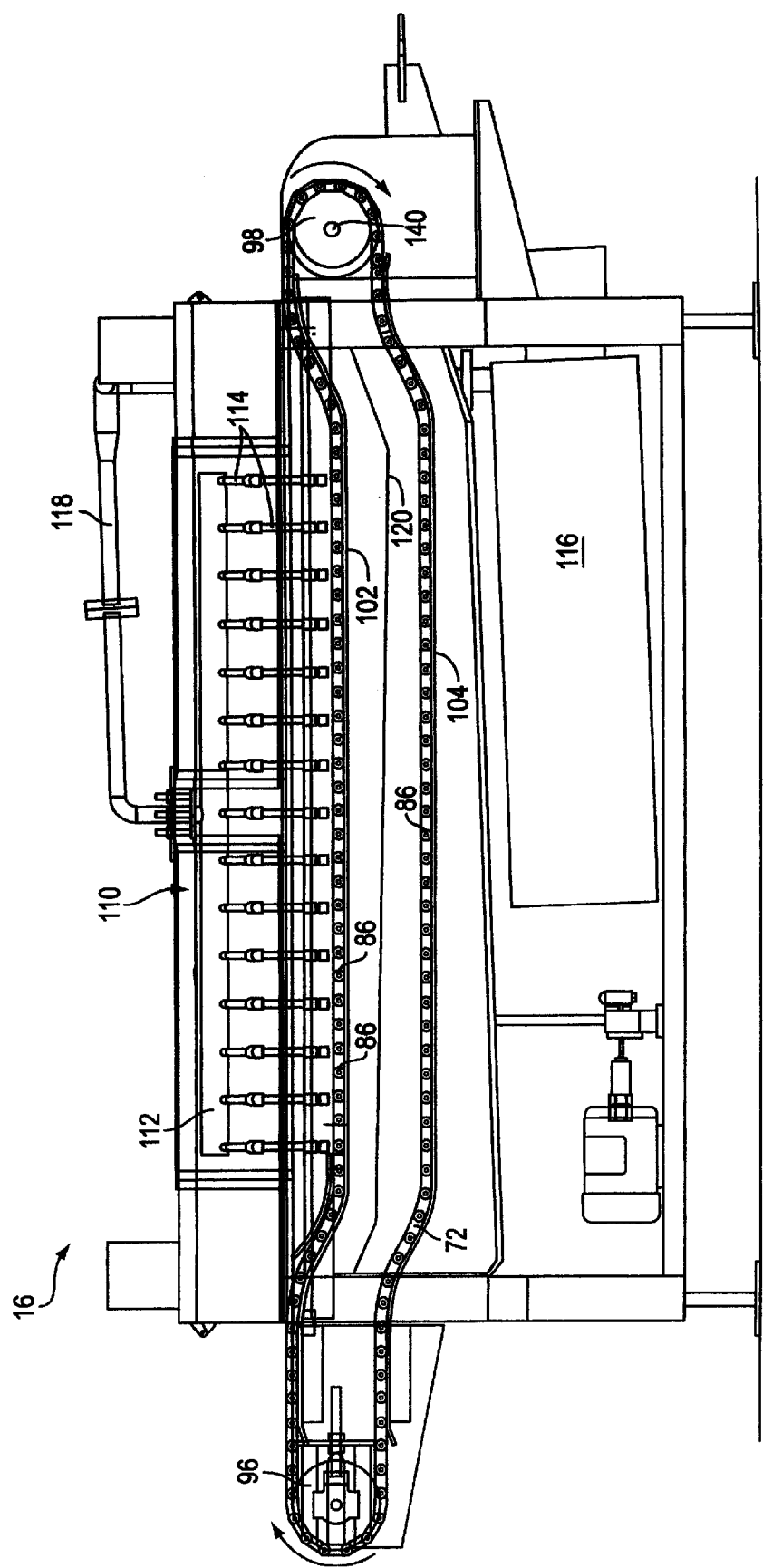
FIGS. 4A, 4B, and 4C are schematic side elevation, plan, and end views, respectively, of the partial fryer shown in FIG. 1.
Figure 4B:
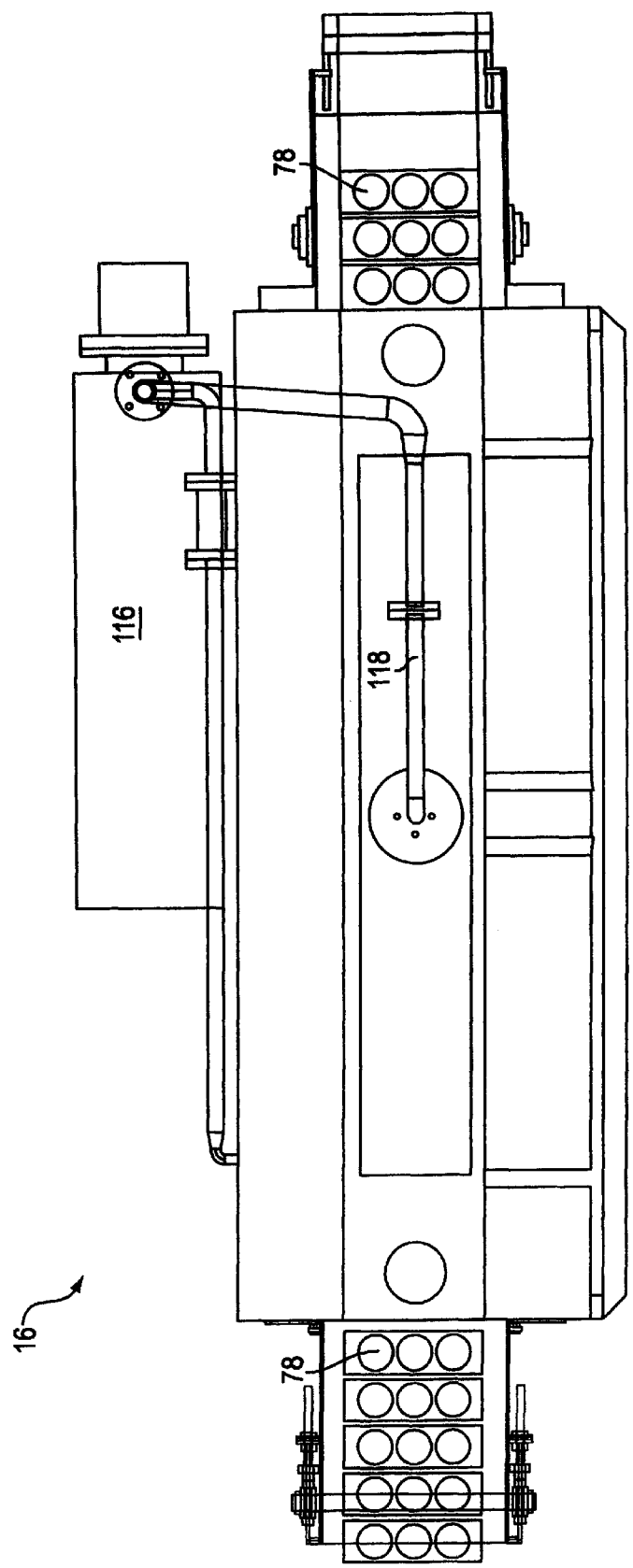
Figure 4C:
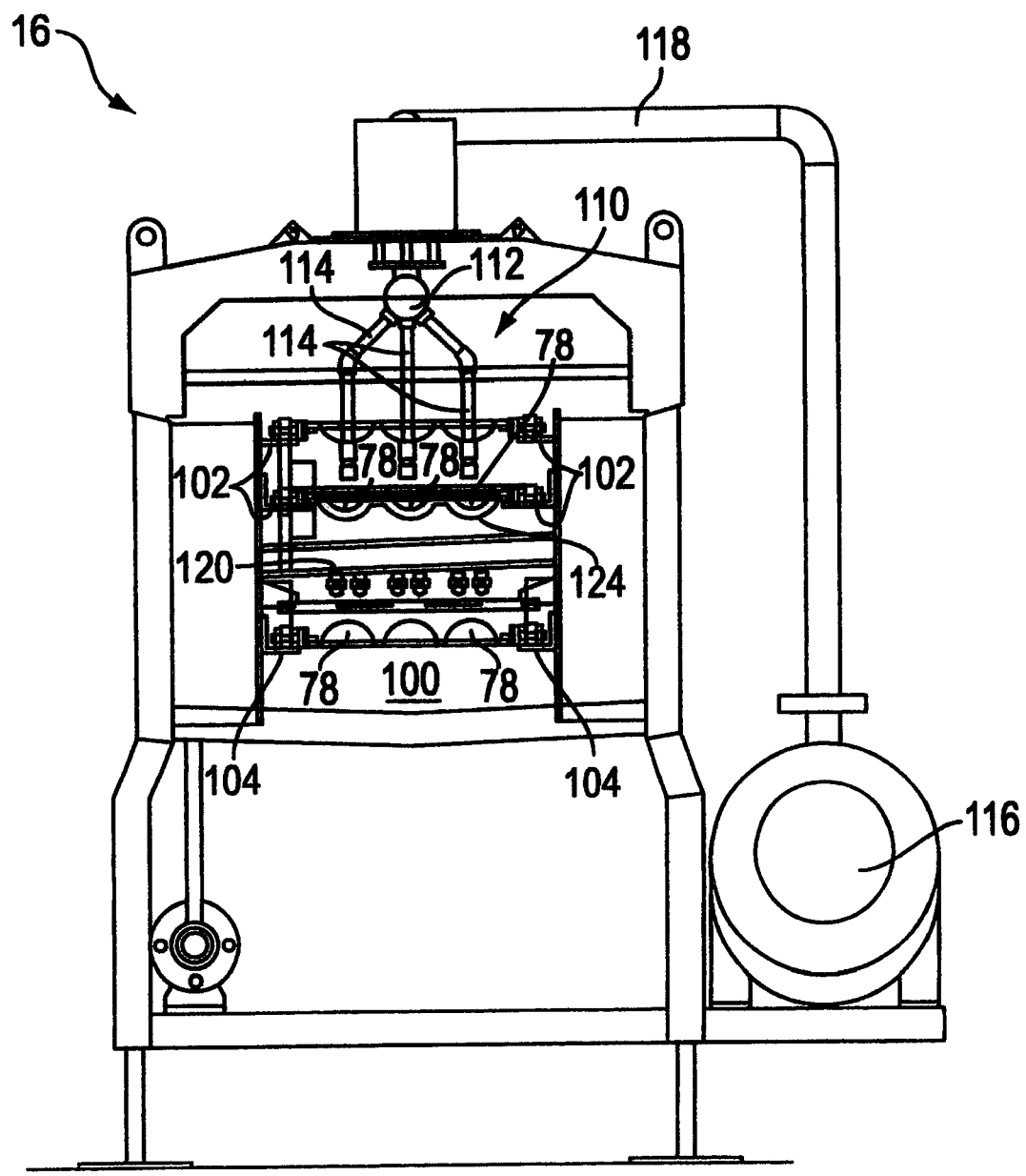
Figure 5:
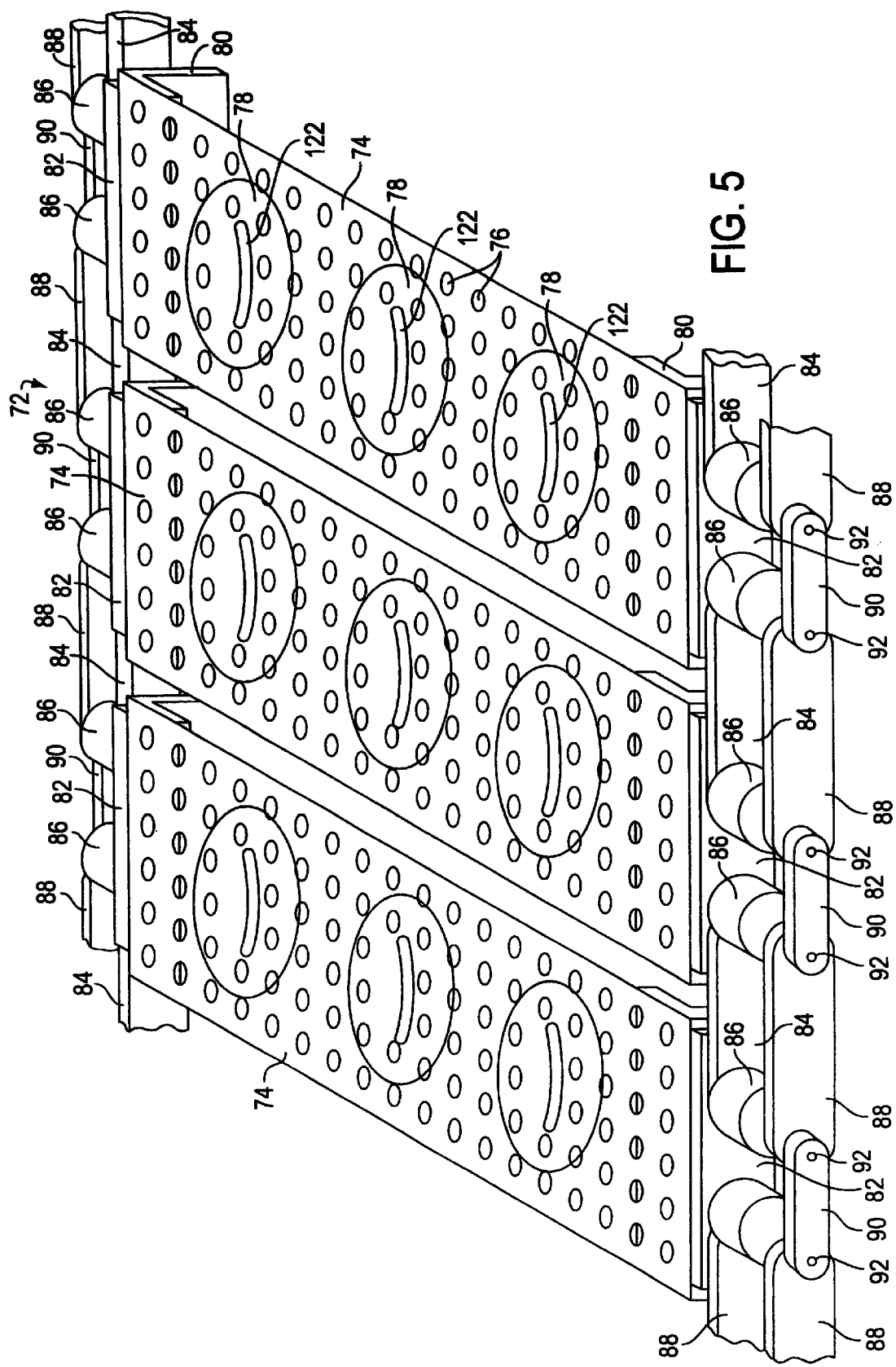
FIG. 5. is a schematic perspective view showing three mold plate links in a continuous belt of mold plates in which bowl-shaped snack food products are made according to the invention.

The centerpiece of the apparatus according to the invention is the partial fryer 16, which is shown in detail in FIGS. 4A, 4B, and 4C. As noted above, the partial fryer 16 includes a continuous belt of perforated mold plates with mold cavities formed therein, as shown in is greater detail in FIG. 5. The "links" of the continuous belt 72 are each composed of a perforated mold plate 74. The mold plates 74 are formed, e.g., from aluminum stock on the order of one sixteenth inch thick and have a multitude of perforations 76 extending through the stock. Each of the mold plates 74 has a number of mold cavities 78, e.g. 3, formed as circular depressions in the plate.

Each mold plate 74 is attached to (e.g. by screws or rivets not shown) and supported by a pair of support members 80. A pair of pins or axles (not visible in FIG. 5) extends laterally from each support member 80. A spacer plate 82 fits over the two pins or axles and against each of the support members 80. Link members 84 are then fitted over the adjacent pins or axles of adjacent support members so as to "straddle" two adjacent support members and link them together. Roller bearing spacers 86 are then placed over the pins or axles, followed by link members 88 which, like link members 84, fit over adjacent pins or axles extending from adjacent support members to straddle, and thereby link, adjacent support members. Finally, retainer links 90 are fit over the ends of each pair of pins or axles and are secured thereto, e.g., by flattening the ends 92 of the pins or axles. In this manner, the continuous chain or belt of mold plates is assembled, with each link of the chain constituting a mold plate with mold cavities 78.

As shown in FIGS. 4A and 4C, the belt 72 is trained around and driven by sprocket drive wheels 96, 98 at either end of the partial fryer 16 (FIG. 4A) and travels through a frying chamber 100 extending through the middle of and substantially along the length of partial fryer 16 (FIG. 4C). The pins or axles extending from the support members 80 should be spaced relative to each other such that the roller bearing spacers 86 are all evenly spaced, as illustrated in FIG. 4A, and the roller bearing spacers 86 should have a large enough diameter such that they support the belt 72 on upper and lower guide rails 102 and 104 which extend along the walls of the frying chamber 100.

In addition to the belt 72 of mold plates, another primary component of the partial fryer 16 is an oil distribution manifold system 110. The oil distribution manifold system includes a central distribution conduit 112 with oil nozzle pipes 114 branching off of and extending down from the central distribution conduit 112. The oil nozzle pipes are arranged in an array over the belt 72, with the same number of "columns" of pipes in the array as there are mold cavities 78 in each plate 72.

The partial fryer 16 also includes heaters (not shown) which heat frying oil to the desired temperature, and requisite plumbing, e.g., pump system 116 and conduit 118 leading from the pump 116 to the central oil distribution conduit 112. Thus, hot oil is circulated through the partial fryer by being pumped through conduit 118 into central distribution conduit 112, and then flowing freely through and out of the oil nozzle pipes 114 as the belt 72 travels under the outlets from the pipes. The hot oil is collected by oil return pan 120 and returned to the pump system 116 by appropriate drain means (not shown).

As explained in greater detail below, the chip preforms are carried through the partial fryer 16 in the mold cavities 78 and are partially fried by hot oil showering down on them from the oil nozzle pipes 114. Additionally, the chip preforms preferably are cooked from below by being carried through a bath of hot oil, which is able to flow up and around the preforms in the bowl-shaped mold cavities 78 through the apertures 76 in the mold plates and through release slots 122 in the bottoms of the mold cavities 78 (FIG. 4), the primary purpose of which will be described below. The bath of hot oil is formed by controlling the flow rate of oil through the system such that oil pools below the preforms contained within the open mold cavities. To reduce the volume of oil that must be pooled, it is preferable to use a conformal oil pan 124 positioned below the upper flight of the belt 72. See FIGS. 4C, 6, and 7. Advantageously, a minimum amount of oil remains inside the fryer, thereby maximizing "oil turnover" and helping to prevent oil degradation. Oil spilling over the edges or ends of the conformal oil pan 124 is caught by the collector pan 120 and recirculated through the system.

Thus, it will be understood that the chip preforms are transferred from the conveyor 50 into the open mold cavities 78 by sliding down along the air slide 14 into the mold cavities, as shown in FIGS. 1 and 3, and then they are partially cooked in the partial fryer 16 as they are transported under a cascade of hot oil which fills the chip preforms from above to cook the bowl-shaped-preforms from the inside. Additionally, the chip preforms are lowered into a pool of hot oil so that hot oil flows up and around the preforms from below to cook the bowl-shaped preforms from the outside. This approach to cooking the chip preforms—cooking them with oil both inside the bowl and outside the bowl—is preferred so as to avoid differential cooking, i.e., cooking from one side only, which can cause the final bowl-shaped chips to crack.

Preferably, the partial fryer 16 is constructed with the downstream end of the conformal pan 124 at a lower elevation than the upstream end. Additionally, the flow rate of oil preferably is controlled so that the pool of hot oil does not extend as far to the left (FIG. 4A) as the array of oil nozzle pipes 114 does. As a result, the bowl-shaped-chip preforms begin to be filled with oil from above before they are partially immersed in the pool of hot oil below. This prevents the preforms from being floated up in the mold cavities by the oil bath below, which would ruin their bowl shape.

As shown in FIG. 8, it is preferable to attach a small baffle or flow diverter 130, e.g. a small vane, to the end of the oil nozzle pipes 114 (at least in the upstream-most row of oil nozzle pipes) such that the baffle or flow diverter 130 deflects or breaks up the flow of oil streaming out of the pipes 114. This prevents the oil from striking the uncooked chip preforms so hard that it tears them, particularly on the edges of the release slots 122 at the bottom of the mold cavities and more particularly before the preforms are partially immersed in oil from below.

Furthermore, as shown in FIG. 7, it is preferable that only about the lower third of the chip preforms are immersed in the bath of hot oil. This is because the chip preforms receive sufficient oil from above (i.e., inside the bowl) to be fried sufficiently from the bowl side, and immersing the mold cavities more deeply into the oil tends to cause the preforms to float up and out of the mold cavities.

The chip preforms are only partially cooked in the partial fryer 16. In particular, they are cooked just until they are sufficiently rigid to retain their bowl shape independent of the mold cavities 78. Thus, in a preferred embodiment of the invention using corn masa with an uncooked moisture content of 49.5%, an oil temperature of 360° F., and an oil flow rate through the system of six to eight gallons per minute with the velocity kept as low as possible to prevent tearing the preforms, the chip preforms will be fried to the desired, partially cooked state within approximately ten to fifteen seconds residence time in the hot oil. It should be noted, e.g., in FIG. 4A, that hot oil cascades down from the oil nozzle pipes 114 into the bowl-shaped preforms along most of the length of the partial fryer 16. This keeps the preforms filled with hot oil as they travel through the fryer and oil boils away, thereby ensuring that the temperature of the oil inside the bowls is elevated.

The length of the partial fryer 16 or, more easily, the linear speed of the belt 72 can be adjusted to control the residence time of the chip preforms in the oil. The rotational speeds of the sheeter and cutter rollers and the linear speed of the conveyor belt 50 used to transport the chip preforms from the sheeting/die-cutting rollers to the air slide 14 and into the mold cavities are also adjusted as the speed of the belt 72 is adjusted such that all of the above-mentioned units are synchronized. This is so that the chip preforms are centered when they slide into the mold cavities.

Once the preforms are partially cooked to the desired state, e.g., to a moisture content on the order of 15%–20%, they are "ramped up" out of the oil at the downstream end of the partial fryer 16 as the belt 72 rises along the guide rail 102. As the mold plates 74 rotate around the sprocket drive wheels 98, the mold cavities are inverted and the partially cooked chip preforms are dumped out onto conveyor 18 (FIG. 1).

As shown in FIG. 9, the sprocket drive wheels 98 (shown schematically without teeth) are mounted on shaft 140 coaxially with a set (e.g. three, corresponding to the number of mold cavities 78 in each mold plate 74) of ejector disks 142. As shown in FIG. 10, the ejector disks 142 extend slightly into the mold cavities 78 through release slots 122 and the bottoms of the cavities 78 as the mold plates 74 move into engagement with and rotate around the sprocket drive wheels 98. This helps dislodge any chips which may be stuck in the mold cavities.

As the mold cavities are inverted and the ejector disks extend through the release slots into the mold cavities, the partially fried chips 146 (FIG. 1) are dumped onto transfer conveyer 18. At this point in time, the chips 146 are sufficiently cooked to maintain their bowl shape outside of or independent of the mold cavities. The transfer conveyor 18 transports the partially cooked, bowl-shaped chips 146 to secondary fryer 20, where the partially fried chips are dropped into another fryer 148. Preferably, the transfer conveyer 18 is a wire mesh or chain link belt, which allows oil to drain from the chips.

As shown in FIGS. 11A and 11B, the secondary fryer 20 comprises an elongated vat of hot oil 148. A pair of submergers 152, 154 are provided to submerge the chips and keep them submerged in the hot oil 148, as generally is known in the art. The submergers rotate in the direction indicated by arrows 156, 158, respectively, thereby moving the chips from right to left as shown in FIGS. 11A and 11B. Other means (not shown) may also be provided to circulate the oil in that direction.

A chip orientation device 156 is located downstream of the submergers. The chip orientation device is provided to ensure that the chips are removed from the oil 148 by the take-away conveyor 22 bowl-side down. By having the chips so oriented, oil drains from the chips more thoroughly and does not settle or sit in the bowl of the chips, which can lead to over-cooking of the chips and/or to oil-soaked chips.

The chip orientation device 156 consists of a basket 160 that is made from wire mesh or perforated sheet metal. The basket 160 is supported in the oil by plunger shaft 162 which, in turn, is supported by plunger driver 164. The plunger driver plunges the basket 160 up and down, into and out of the oil bath. As the basket 160 submerges, it pushes the bowl-shaped chips deeper into the oil. Then, as the basket moves upward, the chips float up toward the surface of the oil. As they do so, hydrodynamic forces on the chips automatically cause the chips to float up towards the surface with their bottoms up, i.e., with the open ends facing down. Preferably, the basket 160 is retracted upward faster than the chips float upward so that the chips are permitted to return toward the surface in an unhampered manner. Furthermore, the basket 160 preferably is oscillated up and down at a frequency on the order of two cycles per second, although the actual value will depend, for example, on the rate at which chips are moving through the system; chip volume; oil viscosity, velocity, and volume; fryer dimensions; etc.

As the chips float up toward the surface, they also continue to move downstream. They are then lifted out of the oil by the take-away conveyor 22, which carries the chips downstream for further processing, e.g. seasoning and packaging. Preferably, the final product take-away conveyor 22 is formed from wire mesh or metal links, and it may be formed from several stepped or staggered sections to facilitate draining of the oil from the chips as they tumble over the steps of the conveyor.

In general, the bath of oil 148 should be maintained at a temperature on the order of 360° F. The length of the secondary fryer 20 and/or the rate at which the chips move through the fryer is/are tailored such that for tortilla chips made from corn masa, the chips reside in the secondary fryer for approximately thirty-five to forty seconds. A final moisture content of the chips of 1.1% is most desirable, but a final moisture content of 0.6% to 2.4% is deemed to be acceptable. The oil residence time and oil temperatures in the partial fryer 16 and secondary fryer 20, as well as the intermediate and final product moisture content will, of course, vary somewhat depending on the particular type of snack food chips being manufactured.

With the above-described apparatus configuration and method, bowl-shaped snack food products, e.g. chips, can be made quickly, easily, and efficiently. Furthermore, by partially frying the chips in a partial fryer and then transferring the chips to a secondary fryer for completion of the cooking, the layout of the apparatus can be modified to take up relatively little floor space in the manufacturing facility. Additionally, the above-described configuration reduces the overall length of the processing line, which reduces the amount of oil being used. With less oil being used, it becomes easier to maintain the quality of the oil, which is recirculated through use, and hence the quality of the final product.

Other embodiments and configurations are deemed to be within the scope of the following claims.

What is claimed is:

1. An apparatus for making a bowl-shaped snack food product, said apparatus comprising:
    a housing;
    a plurality of mold bodies disposed within said housing, said mold bodies each having one or more upwardly opening, bowl-shaped mold cavities formed therein for receiving chip preforms made of uncooked dough and for shaping each of said chip preforms into a bowl shape; and a cooking medium distribution system disposed above said mold bodies so as to fill bowl-shaped chip preforms disposed within said mold cavities with a first cooking medium from above, thereby cooking said chip preforms from the inside of the bowl formed thereby,
    wherein said mold bodies are linked together to form an endless belt of mold bodies which circulates at least partially within said housing and wherein said mold cavities have slots formed in bottom portions thereof, said endless belt being trained around one or more ejector wheels which extend into said mold cavities through said slots to eject said at least partially cooked chip preforms.

2. The apparatus of claim 1, wherein said mold cavities have perforated walls which allow said first cooking medium to flow therethrough.

3. The apparatus of claim 2, further comprising a pan disposed within said housing, below said mold bodies, for forming a pool or bath of said first cooking medium, said apparatus being configured such that bottom portions of said mold cavities extend down into said pool or bath of said first cooking medium such that said first cooking medium flows through said perforated walls and cooks said chip preforms from the outside of the bowls formed thereby.

4. The apparatus of claim 3, wherein said apparatus is configured such that said bowl-shaped chip preforms are at least partially filled with said first cooking medium from above before said bottom portions of said mold cavities extend down into said pool or bath of said first cooking medium.

5. The apparatus of claim 1, wherein said cooking medium distribution system comprises an array of nozzle pipes extending downward over said mold bodies and wherein said mold bodies move translationally below said nozzle pipes so as to carry said chip preforms through a shower of said first cooking medium being distributed by said nozzle pipes.

6. The apparatus of claim 5, wherein at least some of said nozzle pipes have baffles on outlet ends thereof to deflect, divert, or otherwise break up cooking medium being ejected thereby, thereby reducing the force of impact of said first cooking medium impinging against chip preforms disposed within said mold cavities.

7. An apparatus for making a bowl-shaped snack food product, said apparatus comprising:
    a housing;
    a plurality of mold bodies disposed within said housing, said mold bodies each having one or more upwardly opening, bowl-shaped mold cavities formed therein for receiving chip preforms made of uncooked dough and for shaping each of said chip preforms into a bowl shape;
    a conveyor assembly for transporting said chip preforms to said mold bodies;
    an air-cushioned transfer chute disposed between said conveyor assembly and said mold bodies for transferring said chip preforms from said conveyor assembly into said mold cavities; and
    a cooking medium distribution system disposed above said mold bodies so as to fill bowl-shaped chip preforms disposed within said mold cavities with a first cooking medium from above, thereby cooking said chip preforms from the inside of the bowl formed thereby.

8. The apparatus of claim 7, wherein said mold bodies are configured to move through said housing.

9. The apparatus of claim 8, wherein said mold bodies are linked together to form an endless belt of mold bodies, at least part of said endless belt being disposed within said housing.

10. The apparatus of claim 7, further comprising an ejector mechanism which ejects cooked chip preforms from said mold cavities after said chip preforms have been at least partially cooked by said first cooking medium.

11. The apparatus of claim 10, wherein said mold bodies are linked together to form an endless belt of mold bodies which circulates at least partially within said housing and wherein said mold cavities have slots formed in bottom portions thereof, said endless belt being trained around one or more ejector wheels which extend into said mold cavities through said slots to eject said at least partially cooked chip preforms.

12. The apparatus of claim 7, wherein said air-cushioned transfer chute comprises a plenum into which air is pumped, said plenum being defined by at least one perforated wall along which said chip preforms slide.

13. The apparatus of claim 12, wherein said perforated wall has teardrop-shaped perforations which are configured to direct air at least partially along the surface of said perforated wall in the direction in which said chip preforms slide.

14. An apparatus for making a bowl-shaped snack food product, said apparatus comprising:
    a housing;
    a plurality of mold bodies disposed within said housing, said mold bodies each having one or more upwardly opening, bowl-shaped mold cavities formed therein for receiving chip preforms made of uncooked dough and for shaping each of said chip preforms into a bowl shape;
    a cooking medium distribution system disposed above said mold bodies so as to fill bowl-shaped chip preforms disposed within said mold cavities with a first cooking medium from above, thereby cooking said chip preforms from the inside of the bowl formed thereby; and a secondary cooking station wherein cooking of said chip preforms is completed.

15. The apparatus of claim 14, wherein said secondary cooking station comprises a vat for forming a pool or bath of a second cooking medium.

16. The apparatus of claim 15, further comprising an exit conveyor disposed at least partially in and extending out of said vat for removing cooked bowl-shaped snack food product pieces from said pool or bath of said second cooking medium.

17. The apparatus of claim 16, further comprising chip orientation means for giving said cooked bowl-shaped snack food product pieces a desired orientation before said pieces are removed from said pool or bath of said second cooking medium, said orientation means comprising a reciprocating plunger which submerges said product pieces more deeply in said second cooking medium and then allows said product pieces to float up toward the surface of said second cooking medium.

18. The apparatus of claim 17, wherein said desired orientation of said bowl-shaped snack food pieces is open-end-down and wherein said plunger reciprocates at a frequency which allows hydrodynamic forces to cause said snack food pieces to assume said desired orientation as said snack food pieces float up toward the surface of said second cooking medium.

* * * * *